Sept. 17, 1935.  J. C. McCUNE  2,014,857
SAFETY CAR CONTROL EQUIPMENT
Filed Nov. 7, 1930
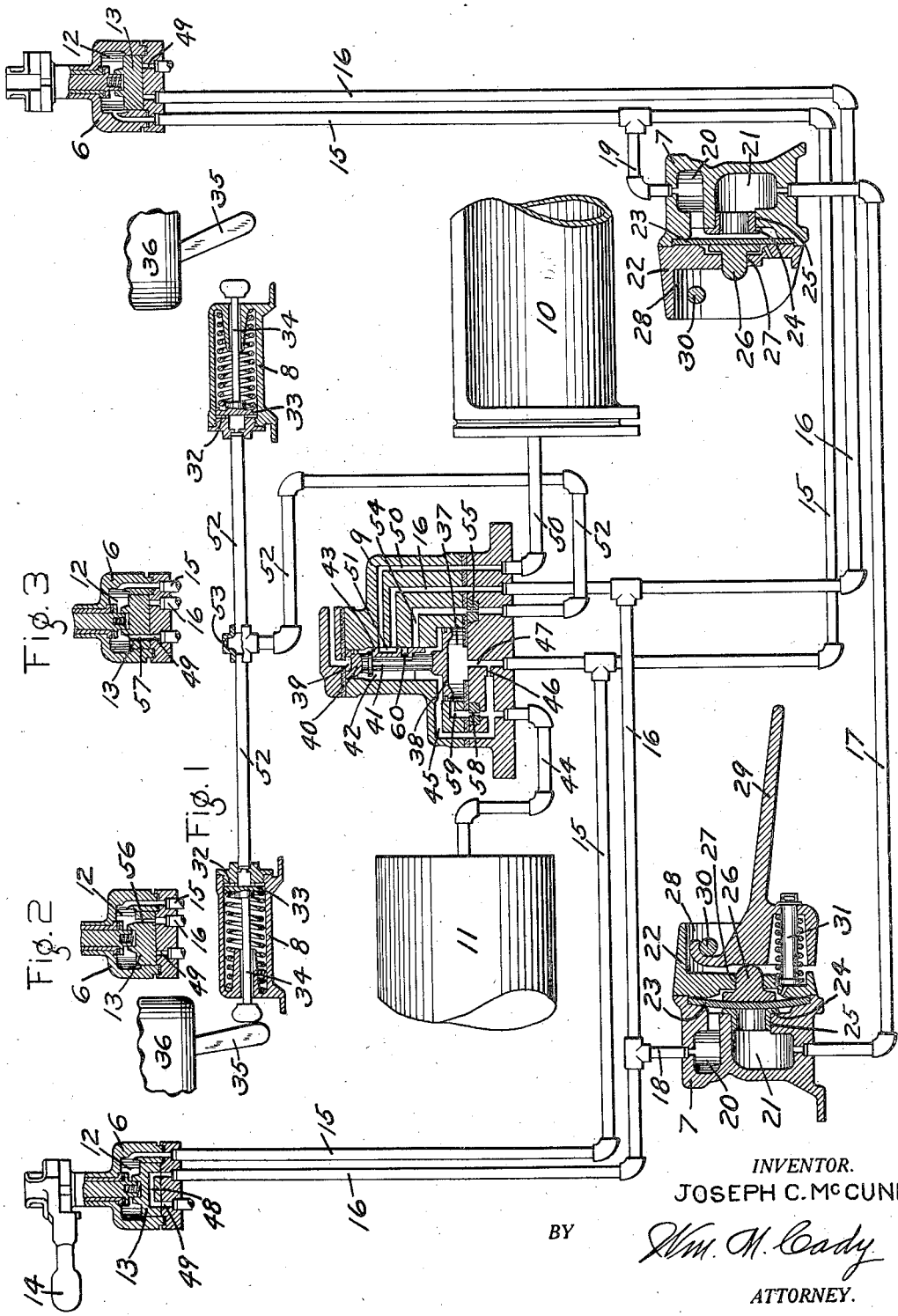
INVENTOR.
JOSEPH C. McCUNE
BY
*Wm. M. Cady*
ATTORNEY.

Patented Sept. 17, 1935

2,014,857

UNITED STATES PATENT OFFICE 2,014,857

SAFETY CAR CONTROL EQUIPMENT

Joseph C. McCune, Edgewood, Pa., assignor to The Westinghouse Air Brake Company, Wilmerding, Pa., a corporation of Pennsylvania Application November 7, 1930, Serial No. 493,956

3 Claims. (Cl. 303—19)

This invention relates to fluid pressure brakes, and more particularly to safety car control equipment.

An object of the invention is to provide an improved and simplified safety car brake equipment.

Another object of the invention is to provide an improved safety car brake equipment in which means are provided for automatically applying the brakes in case the operator releases a controlling member.

Another object of the invention is to provide an improved safety car control equipment of the character mentioned which is simple in construction, and reliable and exact in function under all conditions of service.

The invention also comprises certain new and useful improvements in the construction, arrangement and combination of the several parts of which it is composed, as will be hereinafter more fully described and claimed.

In the accompanying drawing; Figure 1 is a diagrammatic view, mostly in section, of a safety car control equipment embodying the invention, the parts being shown in release or running position; Fig. 2 is a view of a portion of one of the brake valves in service application position; and Fig. 3 is a view similar to Fig. 2, showing the brake valve in emergency position.

Referring to the drawing, the equipment is of the usual double end type and comprises at each end of the car, a brake valve device 6, a foot valve device 7, and a circuit breaker device 8. The equipment also comprises an emergency valve device 9, a brake cylinder 10, and a main reservoir 11.

The brake valve device 6 comprises a casing having a chamber 12 containing a rotary valve 13 adapted to be operated by a handle 14. As shown, only one brake valve handle is provided per car and is used on the brake valve device at the front or operative end of the car.

The chamber 12 of one brake valve device 6 is connected to the chamber 12 of the other brake valve device by an emergency pipe 15, and a common straight air pipe 16 leads to the seats of both rotary valves 13. The pipes 15 and 16 are also connected to the emergency valve device 9 and also to the foot valve devices 7 in the manner to be hereinafter described.

At one end of the car the emergency pipe 15 is connected through pipe 19 with chamber 20 of the foot valve device 7, while at the other end of the car the straight air pipe 16 is connected through pipe 18 with chamber 20 of the foot valve device at that end of the car.

Each foot valve device 7 is also provided with a chamber 21 and the chambers 21 of the two foot valve devices are connected by a pipe 17.

A pedal carrying member 22 is fixed to a face of each foot valve casing and interposed between said member and the casing is a flexible diaphragm 23 which is adapted to control communication between chambers 20 and 21.

On one side the diaphragm 23 is adapted to seat on a seat bushing 24 secured in a bore 25 in the casing. Engaging the opposite side of the diaphragm is a flange on the inner end of a plunger 26. The plunger 26 is mounted in an opening 27 in the member 22.

Mounted in a cavity 28 formed in the front face of the member 22, is the inner end of a foot pedal 29. The foot pedal 29 is pivotally and detachably supported by a pin 30 secured in the member 7 and spanning the cavity 28. The foot pedal is so disposed relative to the foot valve device that the inner face of the foot pedal engages the outer end of the plunger 26 when the foot pedal is depressed, as shown in Fig. 1. The foot pedal 29 is normally urged away from the end of the plunger 26 by a spring-pressed pin 31 which is mounted in the inner portion of the foot pedal.

Each circuit breaker device 8 may comprise a casing having a piston chamber 32 containing a piston 33 provided with a stem 34 for operating the switch handle 35 of the usual circuit breaker 36.

The emergency valve device 9 is of the usual construction, comprising a casing having a chamber 37 containing a piston 38, and a chamber 39 containing a guide piston 40. Pistons 38 and 40 are connected together by a stem 41 and contained in a chamber 42 intermediate the pistons is a slide valve 43 adapted to be operated by said pistons.

In operation, fluid under pressure is supplied to the main reservoir 11 in the usual well known manner and flows therefrom through pipe 44 to the emergency valve device 9.

Fluid under pressure thus supplied to the emergency valve device flows through passage 45 to valve chamber 42 and from passage 45 through a choke 46 and a passage 47 to piston chamber 37 and at the same time through passage 47 and emergency pipe 15 to the brake valve chambers 12.

Since only one brake valve handle 14 is provided per car, it is applied to the brake valve at the operative end of the car, after being removed from the brake valve at the opposite end of the car. Provision is made for the removal of the brake valve handle in a certain handle off or lap position. In Fig. 1 the equipment as shown is operative at the left end, the brake valve being in release position, while the brake valve at the opposite end is in the inoperative, handle off, or lap position. In both the release and lap positions, fluid under pressure supplied to chamber 12 maintains the rotary valve 13 seated.

With the brake valve handle 14 in release position, the straight air pipe 16 is vented to the atmosphere through a port 48 in the rotary valve 13 and passage 49.

Normally the diaphragm 23 of each foot valve device 7 will remain unseated, so that the chambers 20 and 21 are connected. With both diaphragms unseated, communication is established from the emergency pipe 15 to the straight air pipe 16, through pipe 19, chambers 20 and 21 of the foot valve device 7 at the right, pipe 17, chambers 21 and 20 of the foot valve device 7 at the left, and pipe 18. With the brake valve handle 14 in release position and the straight air pipe 16 vented to the atmosphere as has been described, the emergency pipe 15 will be vented to the atmosphere, through the connecting pipes 17, 18 and 19, the open foot valve devices 7, and the straight air pipe 15. Therefore, when the emergency pipe 15 is charged with fluid under pressure, as has been described, and the operator places the brake valve handle in release position, it is necessary that the diaphragm 23 of one of the foot valve devices be seated so as to cut off the communication from the emergency pipe 15 to the straight air pipe 16.

Since only one foot pedal 29 is provided per car, the foot pedal is applied by the operator, when changing ends, to the foot valve device at the operative end of the car, and in order to prevent an emergency application of the brakes being effected when the brake valve handle is moved to release position, it is necessary for the foot pedal 29 to be held depressed, as shown in Fig. 1, so that the diaphragm 23 is held in engagement with the seat bushing 24, thereby cutting off the communication from chamber 21 to chamber 20.

The fluid pressure supplied to the emergency valve chamber 42 and the emergency piston chamber 37 being equal, the piston 38 is balanced. However, the pressure of fluid in the valve chamber 42, acting on the small piston 40 shifts said piston, piston 38 and slide valve 43 to release position, against the atmospheric pressure acting on the upper side of the small piston.

With the emergency slide valve 43 and the brake valve device 6 at the operative end of the car both in release position, the brake cylinder 10 is connected to the atmosphere through pipe and passage 50, cavity 51 in the emergency slide valve 43, straight air passage and pipe 16, cavity 48 in the rotary valve 13 of the brake valve device and atmospheric passage 49.

The chambers 32 of the circuit breaker devices 8 are connected to the seat of the emergency slide valve 43 by a pipe 52 provided with a vent port 53 and a passage 54 provided with a choke 55.

If it is desired to effect a service application of the brakes, the brake valve handle 14 at the front end of the car is operated to turn the rotary valve 13 to service position (see Fig. 2), in which a port 56 in the rotary valve 13 connects valve chamber 12 to the straight air pipe 16, thereby permitting fluid at main reservoir pressure to flow from chamber 12 through pipe 16, cavity 51 in the emergency slide valve and pipe 50 to the brake cylinder 10, thereby causing the brakes to be applied.

If it is desired to limit the degree of service application, the brake valve rotary valve 13 is turned to lap position when the desired brake cylinder pressure is obtained, in which the connection to the straight air pipe 16 is lapped by the rotary valve, so as to cut off further flow of fluid under pressure to the brake cylinder.

To release after an application of the brakes, the rotary valve 13 is turned to release position (see Fig. 1). In release position communication is established between the brake cylinder 10 and atmosphere, in the manner hereinbefore described, through which fluid under pressure is vented from the brake cylinder, thereby releasing the brakes.

If it is desired to effect an emergency application of the brakes, the brake valve rotary valve 13 is moved to emergency position (see Fig. 3), in which the straight air pipe 16 is lapped and the emergency pipe 15 is connected to the atmospheric passage 49, through valve chamber 12 and a port 57 in the rotary valve 13. Fluid under pressure is thereby vented from the emergency piston chamber 37 at a rate exceeding the rate of supply to said chamber through choke 46 and through a choke 58 in passage 59.

The pressure of fluid in valve chamber 42 acting on the emergency piston 38 then shifts said piston downwardly to emergency position, against the reduced pressure in chamber 37.

In moving to emergency position, the piston 38 shifts the slide valve 43 to a position in which passage 50 from the brake cylinder 10 is connected to valve chamber 42. Fluid at main reservoir pressure is thus permitted to flow therefrom to the brake cylinder and apply the brakes in emergency.

When the emergency piston 38 shifts the slide valve 43 to emergency position, as has just been described, passage 54 from the piston chambers 32 of the circuit breaker devices 8 is connected to the valve chamber 42, through a port 60 in said emergency slide valve. This permits fluid under pressure to flow from valve chamber 42 to piston chambers 32 and the pistons 33 are shifted outwardly, causing the button on the end of the piston stems 34 to engage and operate the circuit breaker switch handle 35 so as to open the circuit.

Inasmuch as the pipe 52 is connected to the atmosphere through the small vent port 53, when fluid is supplied from the main reservoir 11 through pipe 52, for operating the pistons 33 of the circuit breaker device, the exhaust of main reservoir pressure to atmosphere during an emergency application will be limited by the size of the vent port 53.

Since the operator normally presses down on the foot pedal 29, so as to maintain the diaphragm 23 seated against the seat bushing 24, communication from the emergency pipe 15 to the straight air pipe 16 through the connecting pipe 17, will be cut off.

However, should the operator release the foot pedal 29, when the brake valve handle 14 is in any but lap position, an emergency application of the brakes will be effected in the manner to be next described.

With the brake valve in release or running position, should the foot pedal 29 be released, the diaphragm 23 will move away from the seat bushing 24. Fluid under pressure will then be vented from the emergency pipe 15, through the pipe 19, foot valve device 7 at the right end of the car, pipe 17, foot valve device at the left end of the car, pipe 18, straight air pipe 16, cavity 48 in the rotary valve 13 of the brake valve, and atmospheric passage 49. Fluid under pressure is thus vented from the emergency piston chamber 37 and the emergency valve device is operated in the manner heretofore described, to effect an emergency application of the brakes.

Therefore it will be seen that in order to prevent an emergency application of the brakes, when the brake valve is in release or running position, it is necessary for the operator to maintain the foot pedal 29 pressed down, so as to seat the diaphragm 23, and thus cut off the communication through the pipe 17, connecting the emergency pipe 15 and straight air pipe 16.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a straight air pipe, emergency pipe and means operated upon a reduction in fluid pressure for effecting an emergency application of the brakes, of a valve device at each end of the car, each having only one valve which valve is biased to open position, a pipe connecting said valve devices, one valve controlling communication from the emergency pipe to said connecting pipe and the other valve controlling communication from said straight air pipe to said connecting pipe, and manually operated means for actuating one of said valves to hold same closed.

2. In a safety car control equipment, the combination with a straight air pipe, emergency pipe, and a valve device operated upon a sudden reduction in brake pipe pressure for effecting an emergency application of the brakes, of a pair of safety control valve devices, each comprising only one valve, a manually operated member for actuating said valve, and means permitting the valve to open upon release of said member, a pipe connecting said valve devices, one of said valves controlling communication from the straight air pipe to said connecting pipe and the other valve controlling communication from the connecting pipe to the emergency pipe.

3. In a safety car control equipment, the combination with a straight air pipe, emergency pipe, and a valve device operated upon a sudden reduction in brake pipe pressure for effecting an emergency application of the brakes, of a pair of safety control valve devices, each comprising a movable abutment and a manually operated member for actuating said abutment, and a pipe connecting said valve devices, one of said abutments being exposed to the pressure in the emergency pipe and the other abutment being exposed to the pressure in the straight air pipe, and one abutment controlling communication from the connecting pipe to the straight air pipe and the other abutment controlling communication from the connecting pipe to the emergency pipe.

JOSEPH C. McCUNE.